(12) United States Patent
Lee

(10) Patent No.: US 6,926,091 B2
(45) Date of Patent: Aug. 9, 2005

(54) COUNTER-ROTATING TWIN SHAFT SYSTEM FOR GARDENING MACHINES

(76) Inventor: Kai S. Lee, 5235 Raborn Ct., Portage, MI (US) 49024

( * ) Notice: Subject to any disclaimer, the term of this patent is extended or adjusted under 35 U.S.C. 154(b) by 55 days.

(21) Appl. No.: 10/620,993

(22) Filed: Jul. 16, 2003

(65) Prior Publication Data
US 2005/0023010 A1 Feb. 3, 2005

(51) Int. Cl.⁷ ............................................. A01B 33/00
(52) U.S. Cl. ........................... 172/52; 172/42; 172/55; 172/57; 172/60; 172/108; 172/125
(58) Field of Search ................................ 172/108, 125, 172/48, 50, 52, 113, 35, 41, 42, 55, 57, 60, 107; 37/250, 255, 257, 221, 222, 223

(56) References Cited

U.S. PATENT DOCUMENTS

| | | | |
|---|---|---|---|
| 3,128,831 A | * 4/1964 | Arndt | 172/123 |
| 4,402,366 A | * 9/1983 | Dankel | 172/43 |
| 4,519,459 A | * 5/1985 | Reaume | 172/42 |
| 4,620,599 A | * 11/1986 | Zinck | 172/42 |
| 5,101,911 A | 4/1992 | Lee et al. | |
| 5,224,552 A | 7/1993 | Lee et al. | |
| 5,353,881 A | 10/1994 | Lee et al. | |
| 5,520,253 A | * 5/1996 | Kesting | 172/125 |
| 6,092,608 A | * 7/2000 | Leger | 172/15 |

\* cited by examiner

*Primary Examiner*—Victor Batson
(74) *Attorney, Agent, or Firm*—Price, Heneveld, Cooper, DeWitt & Litton, LLP

(57) ABSTRACT

A gardening/landscaping utility machine having a counter-rotating twin shaft system that can perform multiple types of work required for gardening/landscaping, including tilling, trench-edging, weeding, brush cutting, snow removal and lawn mowing. These processes can be accomplished by exchanging attachments from, or altering the orientation of, the counter-rotating twin shafts.

37 Claims, 12 Drawing Sheets

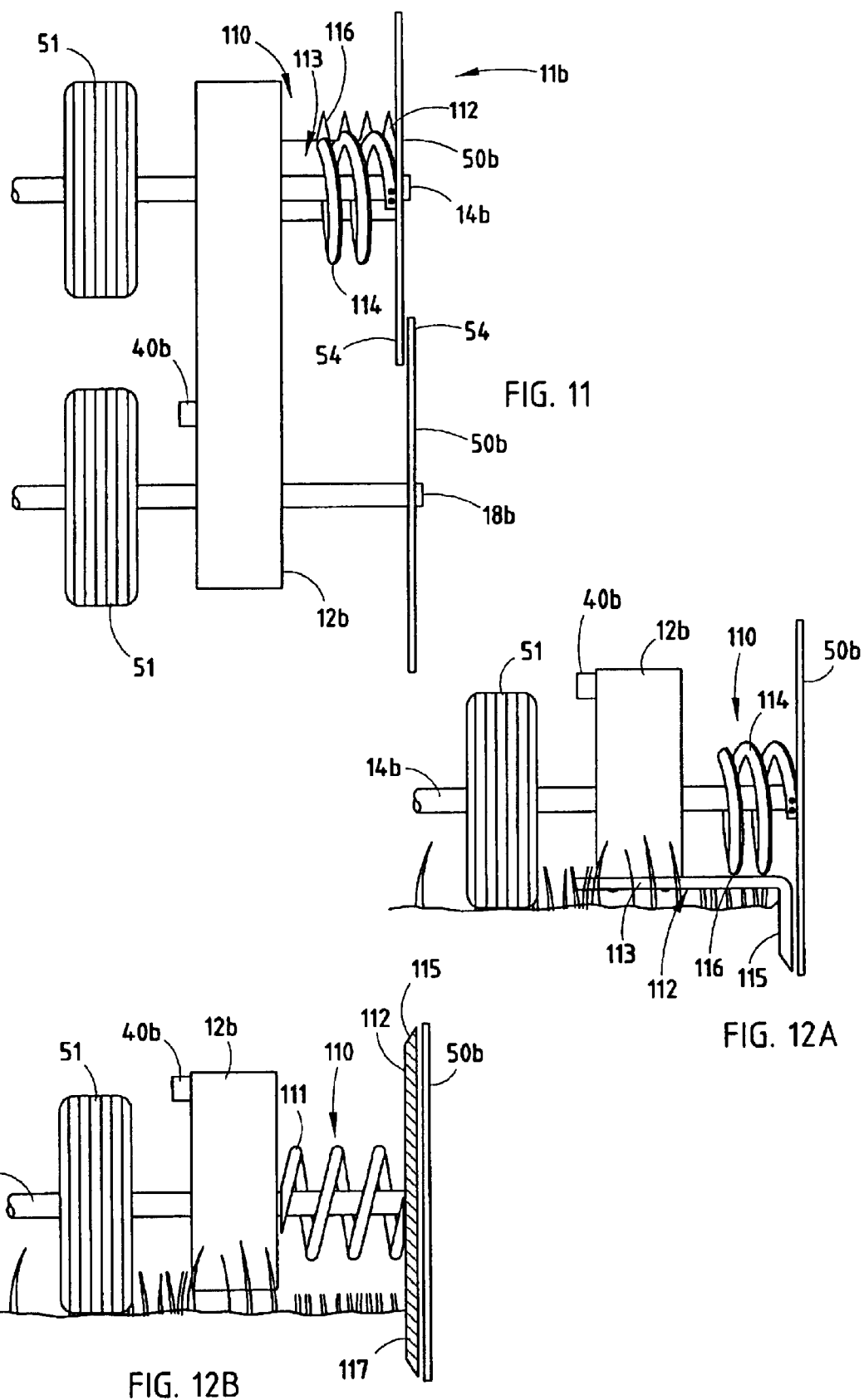

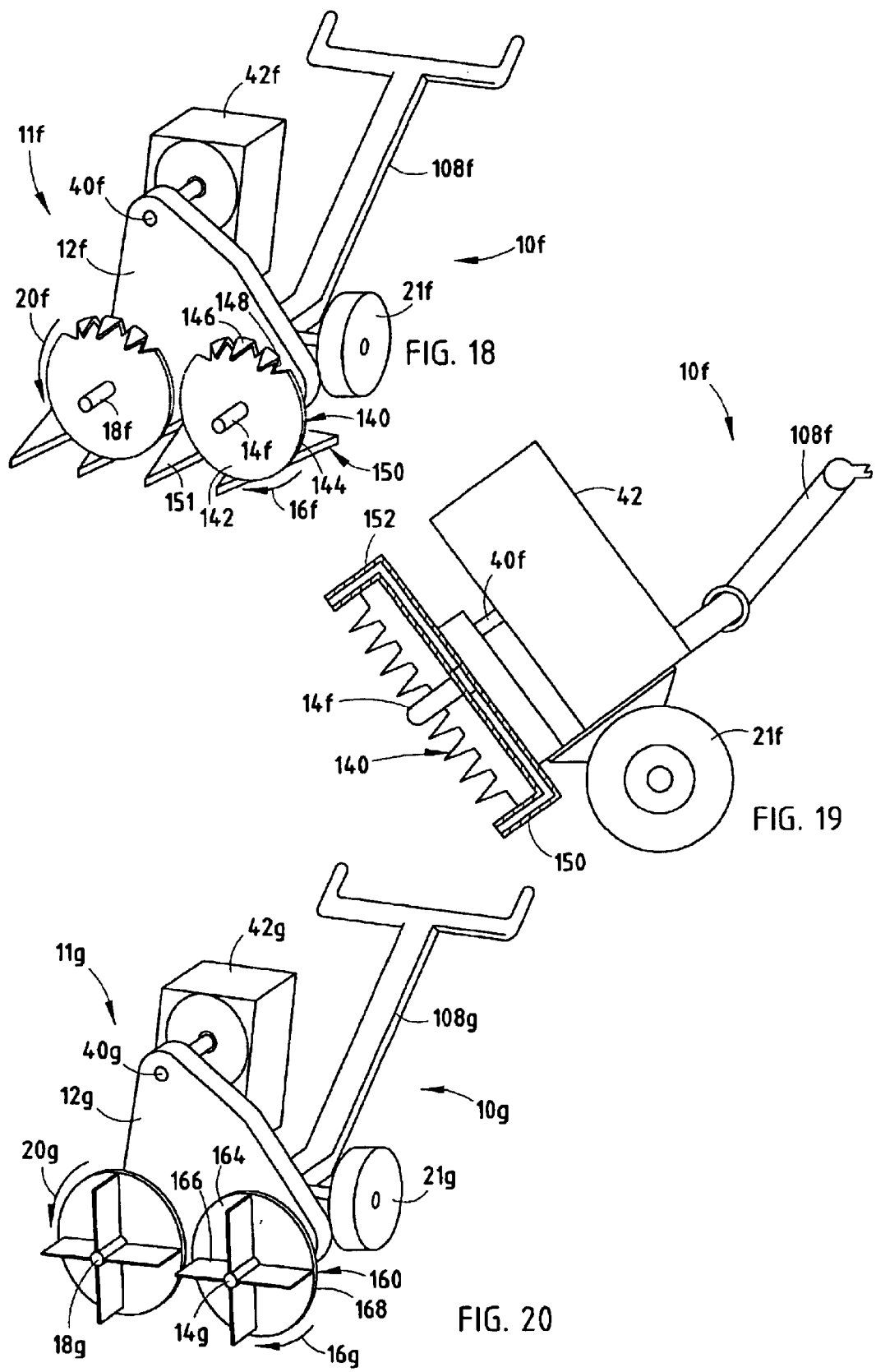

COUNTER-ROTATING TWIN SHAFT SYSTEM FOR GARDENING MACHINES

BACKGROUND OF THE INVENTION

The subject invention is directed toward a garden/landscaping utility system that includes a counter-rotating twin shaft system. This design eliminates many problems associated with conventional unidirectional-rotating single shaft systems and increases the utility of the subject garden/landscaping utility system.

Conventional rototillers used for tilling soil and cultivating in gardening or agricultural work characteristically have a single shaft with a plurality of tines, usually four, affixed thereto. The shafts can be employed at either the front or rear of the associated tiller. With respect to rototillers employing a forwardly located shafts, an engine drives the shaft and the associated tines to rotate in unison in a single direction that simultaneously tills or works the ground and propels the rotor tiller in a forward direction or rearward direction. Rototillers employing a rearwardly located shafts typically also may rotate the shaft in either a forward or rearward direction. In addition, these tillers typically include a forwardly mounted weight and engine supported by a pair of wheels that motivate the machine in a forward direction pulling the associated tines there behind.

While conventional rotor tillers utilizing a single shaft may do an adequate job of tilling previously tilled soils or light soils, conventional tillers do not perform as well in hard soils, soils containing rocks and other debris, and/or soils containing a significant amount of root systems therein. These hard soils, rocky soils, etc., require an increase in the downward force exerted on the tiller by the operator in order to cause the tines to enter the ground. Additionally, the conventional tiller will typically "walk" over these hard soils and skip areas, resulting in uneven tilling of the ground and/or tilling to a very shallow depth.

This problem is partially circumvented by installing a drag bar system or counter-rotating traction wheel which has the net effect of slowing the advance of the machine so that the tines can remain in a given spot for an increased amount of time, thereby allowing deeper penetration of the tines into the given soil. However, neither the drag bar system nor the counter-rotating wheel by itself produces any useful work other than holding the machine back from advancing too quickly across the ground. Another solution to this problem has been the utilization of special traction wheels to generate a counter-rotating traction. This configuration requires a geared transmission which allows frequent switching between directions.

Yet another problem is that the motion of the tines often overpowers the stopping force of the drag bar or the traction of the counter-rotating wheels, thus resulting in an uncontrollable back-and-forth jerking motion of the tiller and an uneven tilling of the soil. As a result, the operator must pull and shove the machine forward and backward in order to smooth the advance of the machine in hard or debris-filled soils, thereby causing fatigue of the operator. A problem associated with most rototillers that include rearwardly located tines is that these machines are large, heavy, are difficult to turn, and require the operation of numerous controls to maneuver.

Yet another problem with conventional rototillers is that hard soils dislodged by conventional rototillers typically remain in large chunks often requiring further breaking apart, either manually or by repeated passes with the tiller.

Still yet another problem with conventional rototillers is that these tillers may not be able to remove foreign materials from within the soil, such as large or heavy root systems. Therefore, attempting to place a garden plot near a heavily wooded area may be impossible, or may require manually digging up and severing the root system independent of the tilling operation.

Finally, conventional tillers are not capable of removing brush and/or small trees from a garden plot. Therefore, if an area containing brush and/or small trees is chosen, these obstacles must be manually removed prior to the tilling of that given area.

Besides the problems mentioned above, typically all conventional rototillers are designed for a single purpose, namely tilling or working the ground. There is a need for a more efficient gardening/landscaping system that is both devoid of the problems associated with conventional rototillers, but is more versatile and widely implemented.

SUMMARY OF THE INVENTION

One aspect of the present invention is to provide a counter-rotating twin shaft gardening/landscaping system that includes a frame, a first shaft mounted within the frame for rotation in a first direction, and a second shaft mounted within the frame for rotation in a second direction which is opposite from the first direction. The second shaft is mounted in a substantially planar direction with the first shaft. The gardening/landscaping system also includes a drive shaft operably connected to the first and second shafts for driving the first shaft in the first direction and the second shaft in the second direction. The gardening/landscaping system further includes a first ground manipulation device attached to the first shaft, wherein the first ground manipulation device has a planar section extending substantially perpendicular to the first shaft and an outer engaging surface having a plurality of irregularities extending therealong, and a second ground manipulation device attached to the second shaft, wherein the second ground manipulation device has a planar section extending substantially perpendicular to the shaft section and an outer engaging surface having a plurality of irregularities extending therealong. At least a select one of the first and second ground manipulation devices includes a plurality of arms extending radially outward from the planar section, wherein the planar sections of the first and second ground manipulation devices cooperate to penetrate a top surface of the ground, and wherein the arms engage the ground to deflect the soil away from the gardening/landscaping system.

Another aspect of the present invention is to provide a gardening/landscaping system that includes a frame, a first shaft mounted within the frame for rotation in a first direction, and drive shaft operatively connected to the first shaft for driving the first shaft in a first direction. The gardening/landscaping system also includes a first ground manipulation device attached to the first shaft, wherein the first ground manipulation device operates in a substantially vertical plane. The gardening/landscaping system further includes a shearing device attached to the first shaft and adapted to shear substantially vertically-oriented and horizontally-oriented foliage extending upwardly and horizontally from a surface of the ground.

Yet another aspect of the present invention is to provide a gardening/landscaping system that includes a frame, a second shaft mounted within the frame for rotation in a second direction, and a driving shaft operatively connected to the second shaft for driving the second shaft in a second direction. The gardening/landscaping system also includes a second ground manipulation device attached to the second shaft, and a recoil dampening device that includes a ground engagement member connected with the frame and movable between a non-engagement position, wherein the ground engagement member tracks along the top surface of the ground, and an engagement position, wherein the ground engagement member engages the ground below the surface and inhibits the second ground manipulation device and therefore the gardening/landscaping system from traveling towards an operator.

Still yet another aspect of the present invention is to provide a counter-rotating twin shaft gardening/landscaping system that includes a frame having a front and defining a forward direction of travel, a first shaft mounted within the frame for rotation in a first direction and extending forwardly of the frame in a direction substantially parallel with the forward direction of travel, and a second shaft mounted within the frame for rotation in a second direction which is opposite from the first direction, wherein the second shaft is substantially parallel to the first shaft. The gardening/landscaping system also includes a drive shaft operatively connected to the first and second shafts for driving the first shaft in the first direction and the second shaft in the second direction. The gardening/landscaping system further includes a first material working device attached to the first shaft and including a substantially planar section and a plurality of first material engaging arms extending outwardly from the planar section, and a second material working device attached to the second shaft and including a substantially planar section and a plurality of second material engaging arms extending outwardly from the planar section, wherein the material working devices cooperate to dislodge debris from in front of the frame as the system moves in the forward direction.

Another aspect of the present invention is to provide a counter-rotating twin shaft gardening/landscaping system for removing hard debris that includes a frame, a first shaft mounted within the frame for rotation in a first direction, and a second shaft mounted within the frame for rotation in a second direction which is opposite from the first direction. The second shaft being substantially parallel with the first shaft. The gardening/landscaping system also including a driving shaft operatively connected to the first and second shafts for driving the first shaft in the first direction and the second shaft in the second direction. The gardening/landscaping device further including a first cutting device attached to the first shaft and including an outer edge having a plurality of irregularities spaced therealong, and a second cutting device attached to the second shaft and including an outer edge having a plurality of irregularities spaced therealong, wherein the outer edge of the first cutting device is located with respect to the outer edge of the second cutting device such that the outer edge of the first cutting device and the outer edge of the second cutting device simultaneously engage the hard debris.

Still yet another aspect of the present invention is to provide a counter-rotating twin shaft gardening/landscaping system that includes a frame, a first shaft mounted within the frame for rotation in a first direction, a second cutting shaft mounted within the frame for rotation in a second direction, and a drive shaft operatively connected to the first and second shafts for driving the first shaft in the first direction and the second shaft in the second direction. The gardening/landscaping system also includes a first cutting disk attached to the first shaft and having a plurality of cutting teeth extending radially outward from an outer edge thereof, and a first stationary cutting disk fixed with respect to the frame and concentrically located with the first cutting disk. The first stationary disk including an outer edge having a plurality of irregularities extending therealong that cooperate with the cutting teeth of the first cutting disk to shear materials therebetween. The gardening/landscaping system further including a second cutting disk attached to the second shaft and having a plurality of cutting teeth extending radially outward from an outer edge thereof, and a second stationary cutting disk fixed with respect to the frame and concentrically located with the second cutting disk. The second stationary disk including an outer edge having a plurality of irregularities extending therealong that cooperate with the cutting teeth of the second cutting disk to shear materials therebetween.

In addition, embodiments of the gardening/landscaping system include alternative orientations of the associated shafts and related ground manipulation tools and cutters, thereby enabling the gardening/landscaping system to accomplish a variety of tasks including but not limited to, tilling, edging, trenching, root cutting, brush cutting, tree and tree stump cutting, lawn mowing and snow removal.

These and other advantages of the present invention will be further understood and appreciated by those skilled in the art by reference to the following written specification, claims and appended drawings.

BRIEF DESCRIPTION OF THE DRAWINGS

FIG. 11 is the top plan view of an alternative embodiment of the working assembly for the gardening/landscaping system;

FIG. 12A is the front view of an alternative embodiment of the gardening/landscaping system;

FIG. 12B is a front view of an alternative embodiment of the gardening/landscaping system as shown in FIG. 12A;

FIG. 18 is a perspective view of an alternative embodiment of the walk-behind gardening/landscaping system;

FIG. 19 is a side view of the alternative embodiment of the walk-behind gardening/landscaping system;

FIG. 20 is a perspective view of a second alternative embodiment of the walk-behind gardening/landscaping system;

DETAILED DESCRIPTION OF PREFERRED EMBODIMENT

Figure 1:
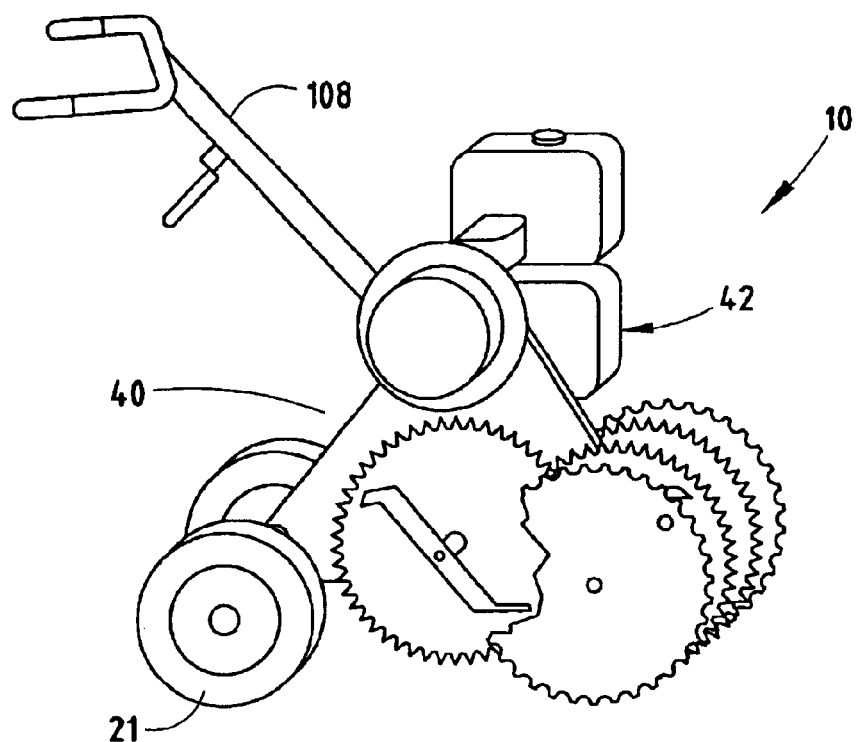
FIG. 1 is a perspective view of a walk-behind gardening/landscaping system embodying the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIG. 1) generally designates a gardening/landscaping system embodying the present invention. In the illustrated example, gardening/landscaping system 10 includes a working assembly 11 (FIG. 2) supported by a frame or transmission box 12, a first shaft 14 mounted within the frame for rotation in a first direction as indicated by an arrow 16, and a second shaft 18 mounted within frame 12 for rotation in a second direction as indicated by an arrow 20, and which is opposite to first direction 16. Specifically, first shaft 14 and second shaft 18 are mounted traversely through side walls 24 and 26 (FIG. 3) of frame 12, and are substantially perpendicular to the normal direction of travel during operation of gardening/landscaping system 10. First shaft 14 is mounted forwardly of second shaft 18 and is substantially parallel thereto. Frame 12 is also supported above the ground by a pair of wheels 21.

The first shaft 14 rotates freely in first direction 16 on a ball bearing 28, provided on each side wall 24 and 26, while second shaft 18 rotates freely in second direction 20 on a similar ball bearing 30, provided within each side wall 24 and 26. First shaft 14 and second shaft 18 extend through apertures 32 and 34, respectively, located within frame 12. Apertures 32 and 34 are concentrically shaped. Inside frame 12, first shaft 14 and second shaft 18 fit through the center opening of sprockets 36 and 38, respectively, (FIG. 4) which both have a similar or different diameter. Rotation of sprockets 36 and 38 cause an exact rotation of first and second shafts 14 and 18.

Figure 4:
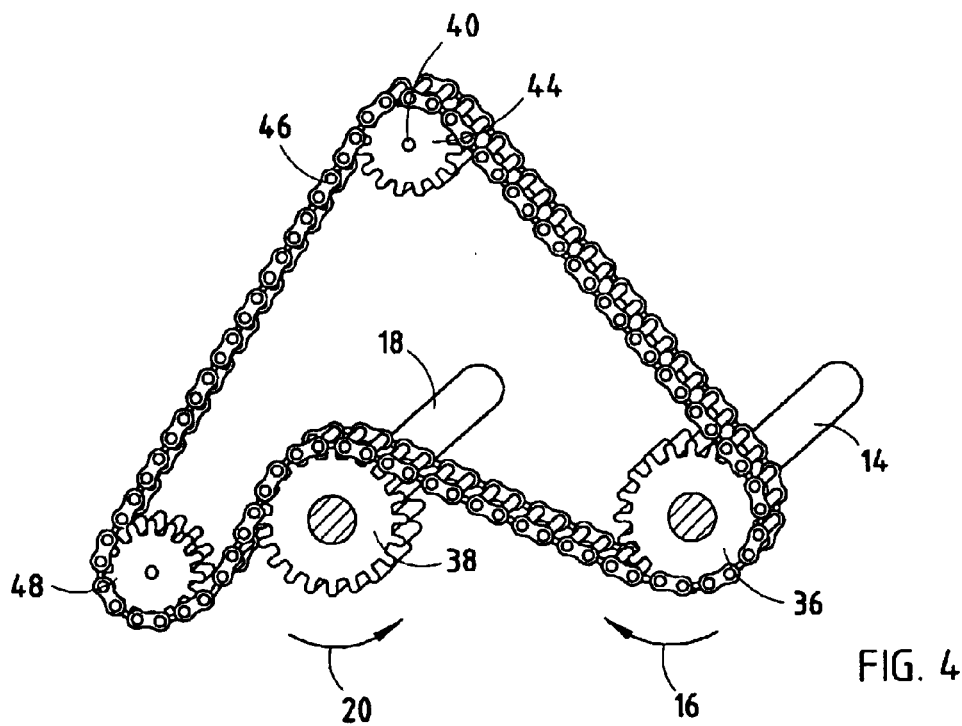
FIG. 4 is a perspective view of the transmission showing linkages thereof.

In a preferred embodiment, gardening/landscaping system 10 also includes a drive shaft 40 extending within a top portion of frame 12 and generally parallel to first shaft 14 and second shaft 18 (FIG. 4). Drive shaft 40 is coupled to an engine 42 at a first end and a sprocket 44 at a second end. Sprockets 36, 38 and 44 are mechanically linked together by a drive chain 46. Drive chain 46 winds circumferentially around the opposite sides of sprocket 36 and sprocket 38, thereby creating a counter-rotational movement therebetween. Specifically, drive chain 46 winds around the teeth of sprocket 36 at the top, right, bottom and lower left circumference thereof, and then reverses its direction by winding around the teeth on the opposite side of sprocket 38 at its top, left and lower left circumference. An idler pulley 48 is used to hold chain 46 in place against the left and lower left circumference of sprocket 38, thereby keeping drive chain 46 firmly engaged with sprockets 36, 38 and 44. Idler pulley 48 is rotatably mounted on side walls 24 and 26 of frame 12. Drive chain 46 engages sprocket 44 after leaving idler pulley 48, thereby completing the drive cycle for gardening/landscaping system 10.

Figure 5:
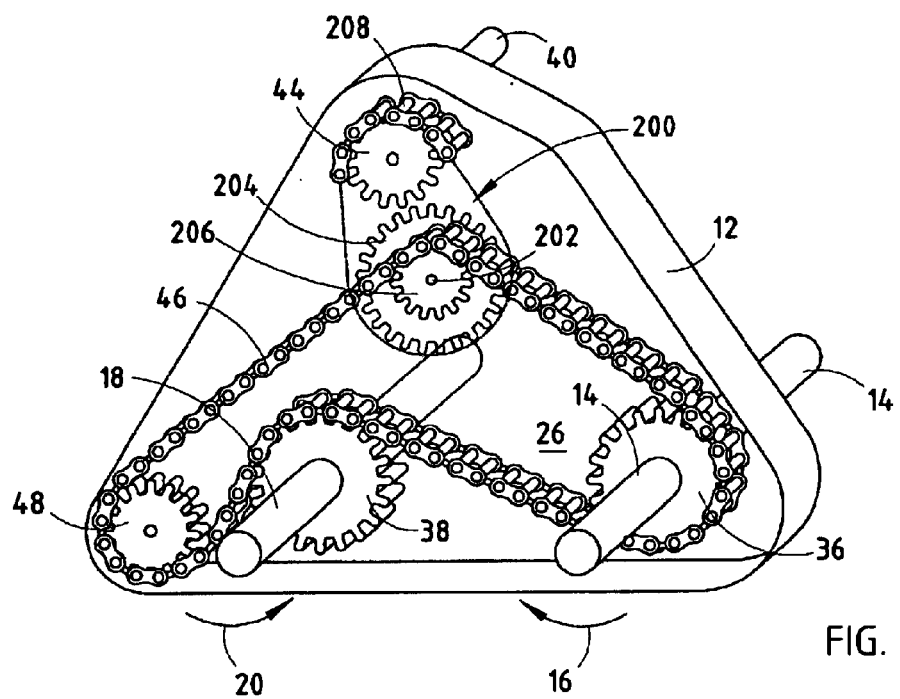
FIG. 5 is a perspective view of an alternative embodiment of the transmission system showing linkages thereof.

In an alternative embodiment, as shown in FIG. 5, gardening/landscaping system 10 includes a step-down sprocket 200 that reduces the rotational speed of shaft 40 as it is transferred to shafts 14 and 18. Sprocket 200 is mounted for rotation within frame 12 via a shaft 202, and includes a large outer sprocket 204 and a small inner sprocket 206, each being fixed for rotation with respect to shaft 202. Large outer sprocket 204 is mechanically coupled with sprocket 44 via a drive chain 208, while small inner sprocket 206 is mechanically coupled with sprockets 36 and 38 via chain 46. In operation, the rotational force exerted by shaft 40 is transferred to sprocket 200 which reduces the rotational velocity of the rotational force as it is transferred to shafts 14 and 18.

Figure 6:
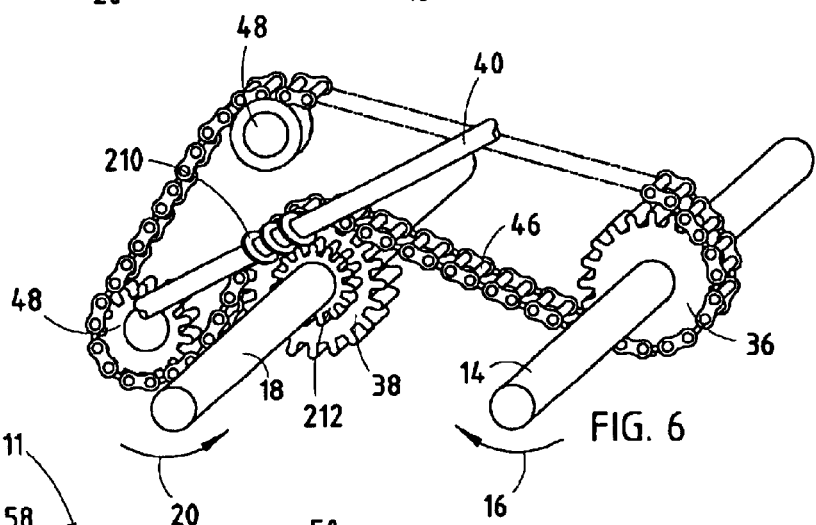
FIG. 6 is a perspective view of an alternative embodiment of the transmission showing linkages thereof.

It should be noted that numerous patterns and systems may be implemented to transfer power from drive shaft 40 to shafts 14 and 18. As illustrated in FIG. 6, drive shaft 40 can be coupled to a worm 210 that cooperates with a worm gear 212 that is fixedly attached to second shaft 18. A sprocket 38 is also fixedly attached to second shaft 18 and is mechanically linked via drive chain 46 to sprocket 36 which is affixed to first shaft 14. In the illustrated example of FIG. 6, worm 210 and worm gear 212 allow a nearly 50 to 1 reduction of the rotation speed of drive shaft 40 to shafts 14 and 18, thereby allowing use of an engine operating at speeds of nearly 7,000 RPM.

The working assembly 11 (FIGS. 2 and 7) further includes two first ground manipulation device 50 removably attached to first shaft 14 and juxtaposed across frame 12. Each first ground manipulation device 50 has a planar section 52 that extends substantially perpendicular to first shaft 14, and an outer engaging edge 54 having a plurality of irregularities 56 spaced therealong. Working assembly 11 also includes two second ground manipulation device 58 removably attached to the second shaft 18 and juxtaposed across frame 12. Each second ground manipulation device 58 includes a planar section 60 extending substantially perpendicular to second shaft 18, and an outer engaging edge 62 having a plurality of irregularities 64 spaced therealong. Working assembly 11 further includes two third ground manipulation devices 59 removably attached to first shaft 14 inboard of first ground manipulation devices 50. Each third ground manipulation devices 59 include a planar section 61, and an outer edge 63 having a plurality of irregularities 65 extending thereabout. It should be noted the ground manipulation devices 50, 58 and 59 need only be included on one side of frame 12.

Second and third ground manipulation devices 58 and 59 include a plurality of arms 66 extending radially outward from the planar section 60 and 61. Each arm 66 includes a pair of first sections 68 extending outwardly from planar sections 60 and 61 respectively. Each first section 68 forms an angle with respect to the direction of rotation suitable for deflecting soil away from the associated planar sections 60 and 61. Each arm 66 also includes a second section 70 that extends between first sections 68 of each arm 66. First sections 68 preferably have a sharpened and serrated leading edge 72 (as illustrated in FIG. 8A) which aids in the movement of the arms 66 through a given soil.

Figure 8A:
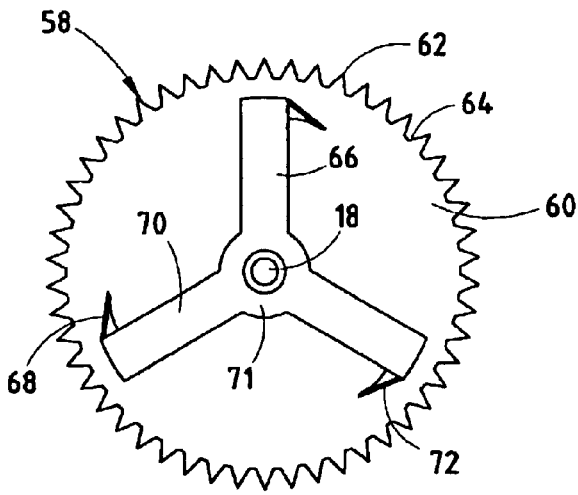
FIG. 8A is a side view of a ground manipulation device of the working assembly.

As illustrated in FIG. 8A, second and third ground manipulation devices 58 and 59 may include arms 66 that include a plurality of first sections 68 extending outwardly from planar sections 60 and 61. Each arm 66 further includes a plurality of second sections 70 extending from an associated first section 68 and a hub section 71 located about shafts 18 and 14.

Figure 8B:
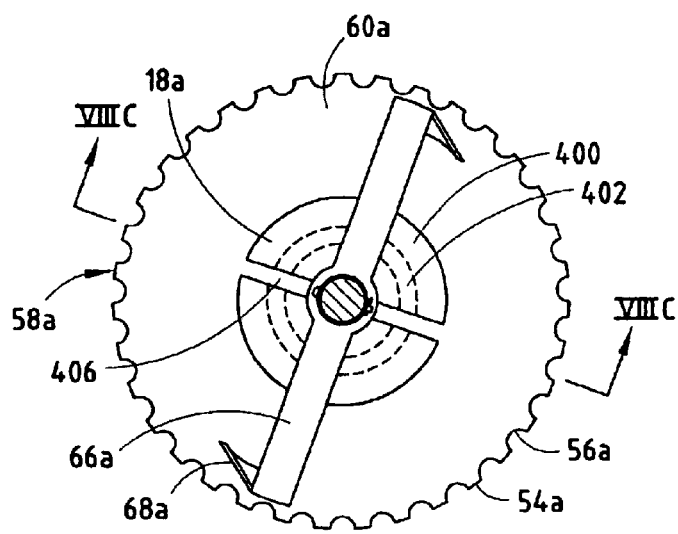
FIG. 8B is a first side view of an alternative embodiment of a ground manipulation device.
Figure 8C:
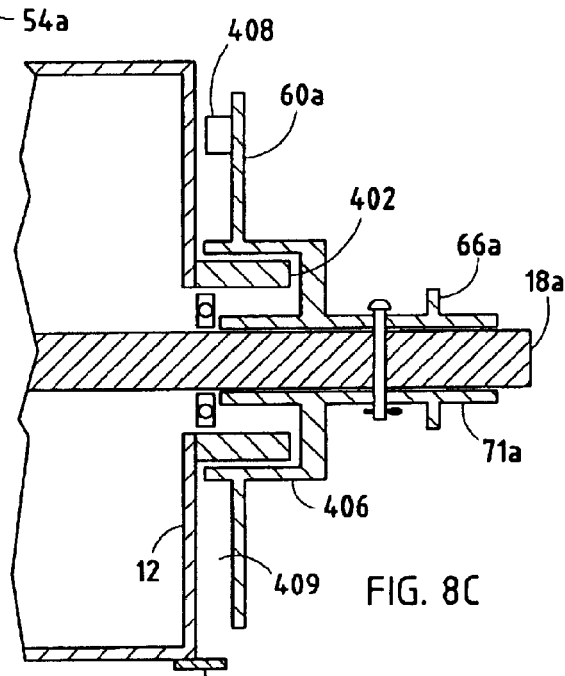
FIG. 8C is a top cross-sectional view of the alternative embodiment of the ground manipulation device of FIG. 8B.
Figure 8D:
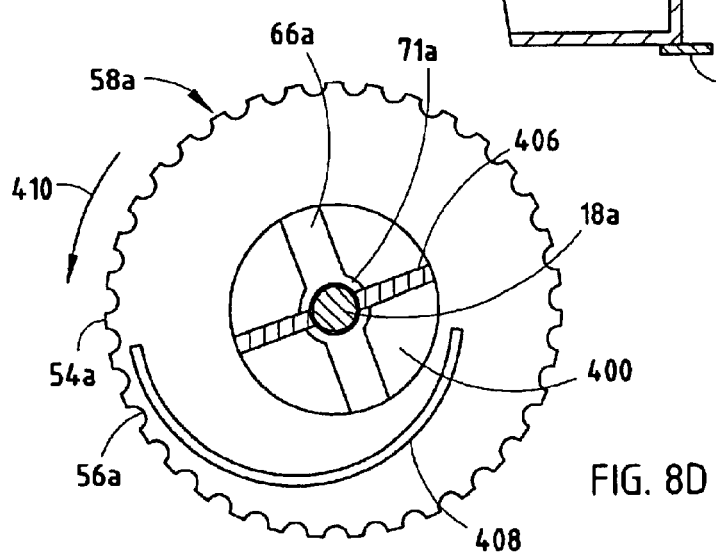
FIG. 8D is a second side view of the alternative embodiment of a ground manipulation device of FIG. 8B.
Figure 8E:
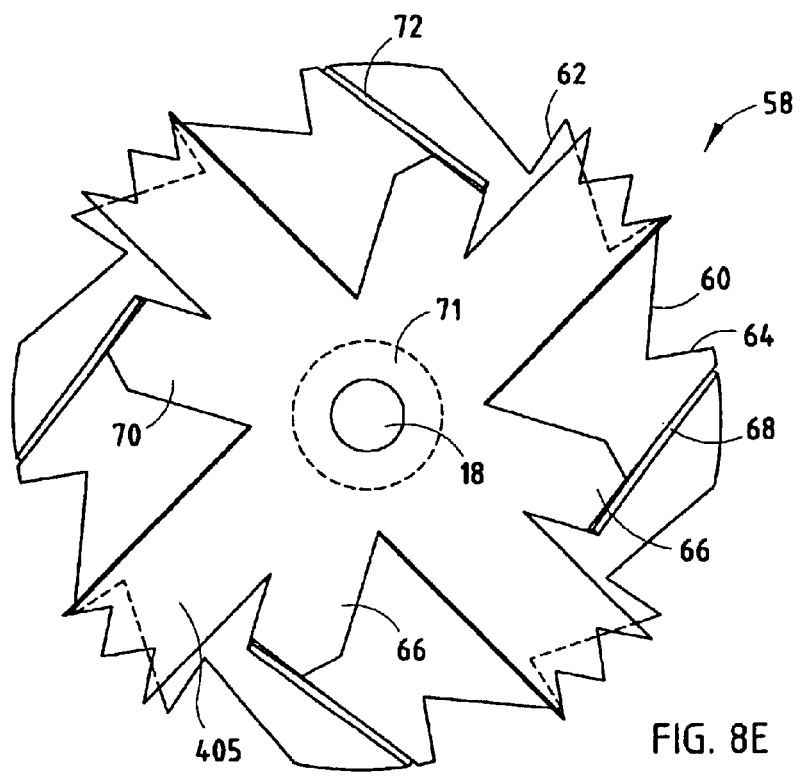
FIG. 8E is a side view of a second alternative embodiment of the ground manipulation device.
Figure 8F:
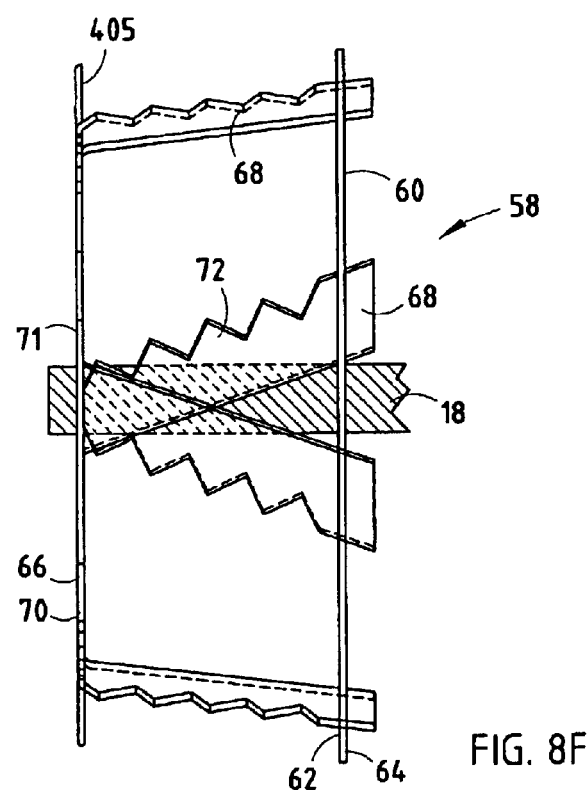
FIG. 8F is a partial, cross-sectional end view of the second alternative embodiment of the ground manipulation device.

In yet another alternative embodiment, the ground manipulation devices 58 and 59 (FIGS. 8E and 8F) include a blade 405 that extends from the hub section 71 to the outer edges 62 and 63 of the planar sections 60 and 61, respectively. In operation, the blades 405 cooperate with the outer edges 62 and 63 and the arms 66 to increase ground penetration.

In an alternative embodiment, the ground manipulation device 58a (FIGS. 8B and 8C) includes a circumferentially extending aperture 400, and a tube 402 extending through the aperture 400 and stationary with respect to the housing 12. The device 58a is similar to the ground/manipulation device 58, therefore, similar parts appearing in FIG. 8A and FIGS. 8B and 8C, respectively, are represented by the same, corresponding reference numeral, except for the suffix "a" in the numerals of the latter. It should be noted that any one of the ground manipulation devices 50, 58 and 59 may be replaced with the ground manipulation device 58a. The aperture 400 is sized so as to allow free rotation of the device 58a about the tube 402 that is fixedly attached to frame 12. The tube 402 extends into a space as defined between the planar section 60a and the arms 66a, and prevents vegetation and the like from making contact with and intertwining with the rotating shaft 18a. Moreover, the tube 402 and the arms 66a cooperate to prevent the vegetation from intertwining with the arms 66a. The device 58a further includes at least one blade 406 fixed with respect to the center hub 71a. In operation, the blade 406 rotates about the outer circumference of the tube 402 sheering any vegetation that may collect there.

The ground manipulation device 58a (FIG. 8D) further includes a central rib 408 extending outwardly from the planar section 60a and spiraling outwardly from the aperture 400 in the operating direction of rotation as represented by directional arrow 410. In operation, the rib 408 clears intertwining vegetation and the like from within the gap 409 formed between the planar section 60a of the device 58a and the frame 12.

The ground manipulation device 58a (FIG. 8C) further includes a scraping blade 407 fixedly attached to and extending outwardly from an underside of the frame 12. The scraping blade 407 is positioned and configured to extend along the gap 409, and during operation prevents the intertwining of vegetation and deters from entering the gap 409.

Figure 2:
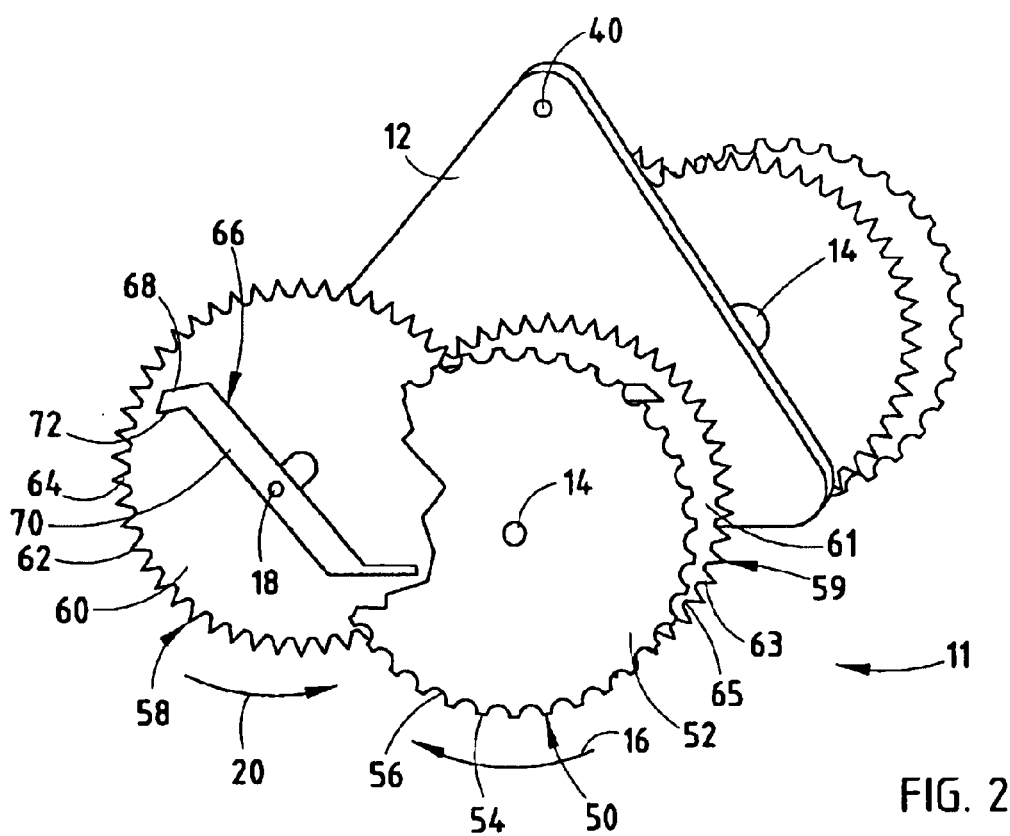
FIG. 2 is a perspective view of a transmission and working assembly of the gardening/landscaping system.
Figure 3:
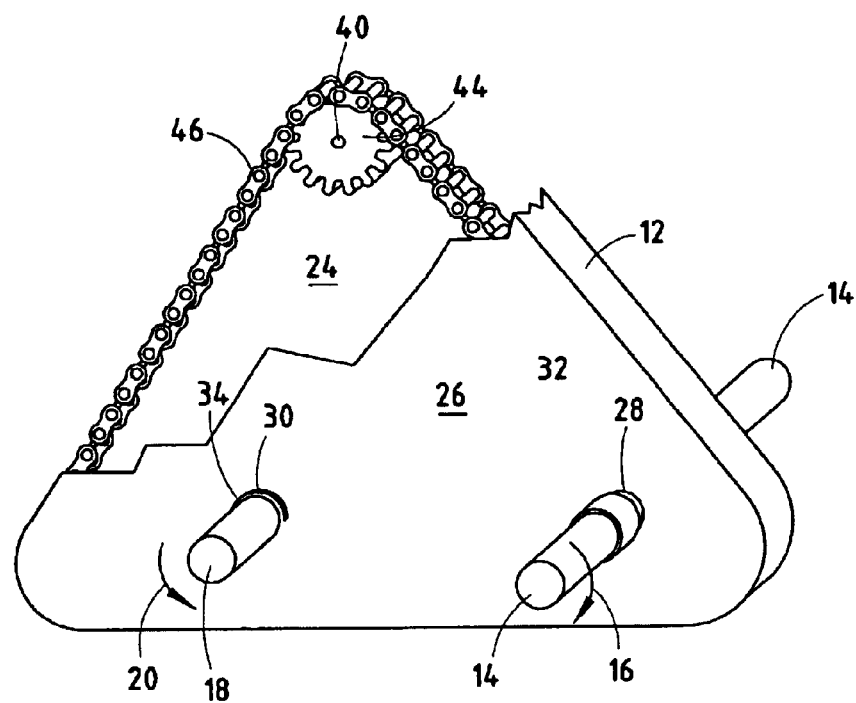
FIG. 3 is a perspective view of the transmission showing linkages thereof.

As illustrated in FIGS. 1 and 2, first ground manipulation device 50 has a serrated outer edge 54, while second and third ground manipulation devices 58 and 59 have saw-like outer edges 62 and 65. However, the outer engaging edges 54, 62 and 65 of first, second and third ground manipulation devices 50, 58 and 59, respectively, may be provided with a shape capable of penetrating the top surface of the ground. It should be noted, that while the serrated edge may provide the advantage of penetrating the top surface of the ground, a saw-like type outer edge has benefits such as the utility of cutting through debris such as underground tree roots and the like. In operation, outer engaging edges 54, 62 and 65 of first, second and third ground manipulation devices 50, 58 and 59, respectively, penetrate a top surface of the ground, while arms 66 engage the ground and deflect soil away from the associated planar sections 60 and 61.

Figure 7:
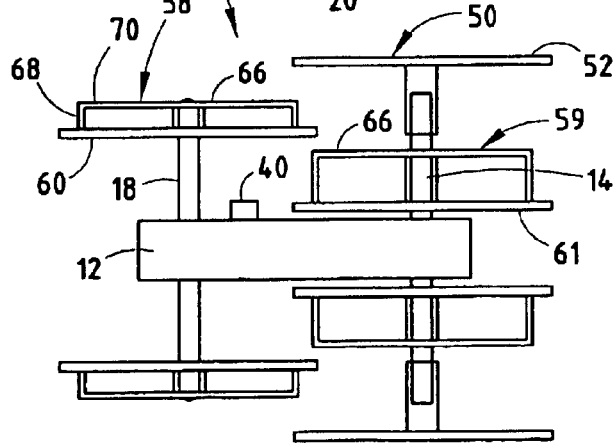
FIG. 7 is a top plan view of the working assembly of the gardening/landscaping system.

The respective position of the ground manipulation devices 50, 58 and 59 are adjustable along the associated shafts 14 and 18, thereby allowing for equal and adequate lateral spacing between devices 50, 58 and 59 (FIG. 7). Preferably, the first ground manipulation device 50 is detachably received on first shaft 14, one on each side wall 24 and 26, and distal to frame 12 with planar section 52 facing to adjacent arms 66 of second ground manipulation device 58. Second ground manipulation devices 58 are detachably received on second shaft 18, with planar section 60 facing arms 66 of the associated third ground manipulation device 59, thereby creating an alternating pattern of arms 66, planar section 60, arms 66 and the planar section 61. Arms 66 of devices 58 and 59 are separated by a planar section 60 or 61 during operation. This separation prevents rocks or debris from being caught between counter-rotating arms 66 of devices 58 and 59 and aids ground penetration, the cutting of underground debris/roots and smoothes the operation of gardening/landscaping system 10 across the ground. It should also be noted that ground manipulation devices 50, 58 and 59 may be used to replace the tilling tines on conventional-type tilling machines.

Figure 9:
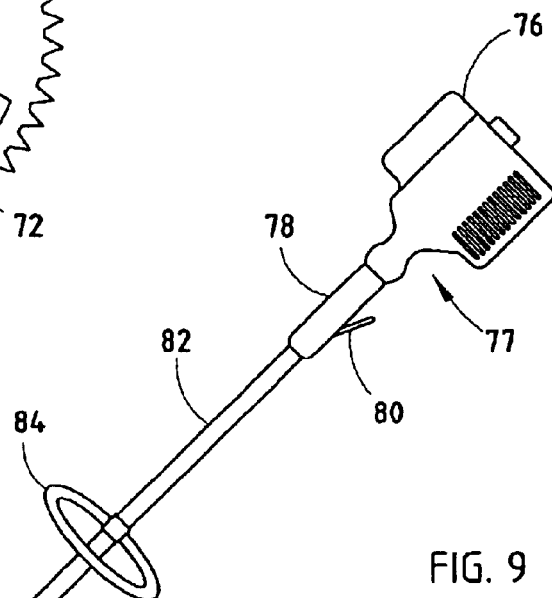
FIG. 9 is a perspective view of a hand-held gardening/landscaping system embodying the present invention.

In an alternative embodiment, the working assembly 11a is attached to a hand-held gardening/landscaping system 74 (FIG. 9). The working assembly 11ais similar to working assembly 11, therefore, similar parts appearing in FIG. 2 and FIGS. 9 and 10, respectively, are represented by the same, corresponding reference numeral, except for the suffix "a" in the numerals of the latter.

Figure 10:
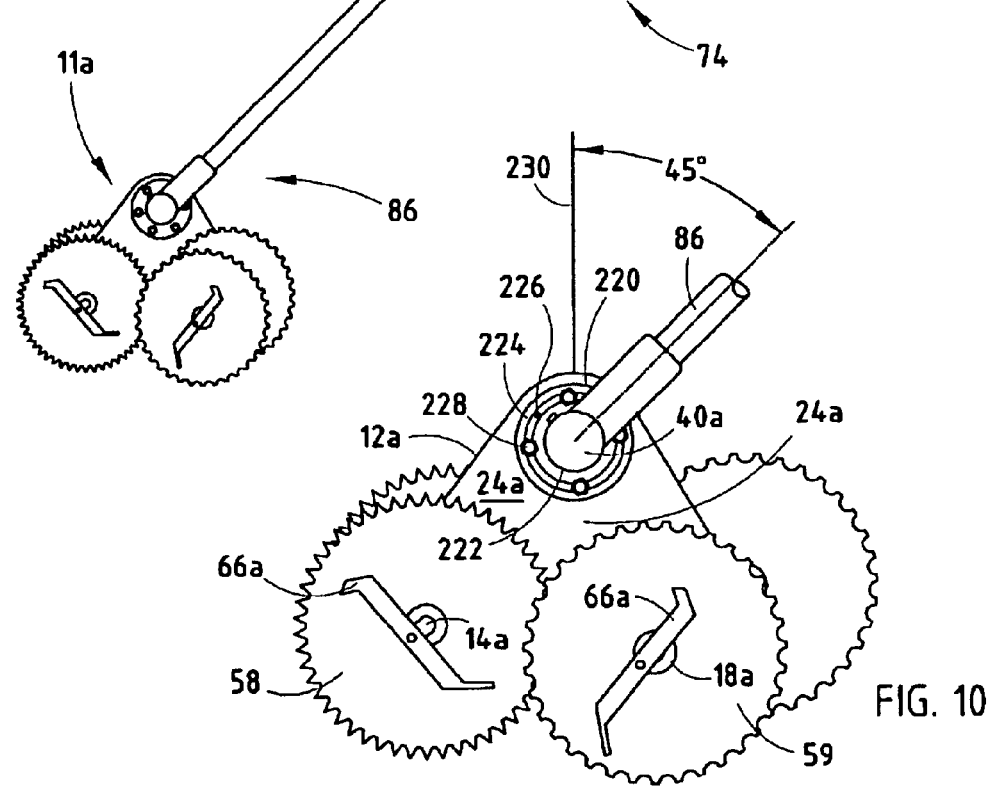
FIG. 10 is a side view of the working assembly of the hand-held gardening/landscaping system.

The hand-held gardening/landscaping system 74 includes power head 76 attached to a first end 77 of a body section 82, a first handle 78, a power trigger 80, a second handle 84, and working assembly 11a attached to a second end 86 of body section 82. Working assembly 11a (FIG. 9) is constructed and arranged similarly to working assembly 11 (FIGS. 2,7) as discussed above, with the most notable exceptions being the inclusion of second and third ground manipulation devices 58a and 59a (FIGS. 9 and 10). In another embodiment, the first, second or third ground manipulation devices 50a, 58a or 59a are mounted along a single side of frame 12a as opposed to both sides of frame 12a, and the inclusion of support wheels 51 which are attached to shafts 14a and 18a, and juxtaposed across frame 12a from the ground manipulation device 50a, 58a and 59a. Support wheels 51 assist in supporting hand-held gardening/landscaping system 74 above the top surface of the ground as it travels therealong.

First end of drive shaft 40a of gardening/landscaping system, as shown in FIGS. 9 and 10, 11a is coupled to second end 86 of system 74 via an angle adjustable coupler 220 that includes a gear-head 222. Gear-head 222 has a radially extending securing flange 224 that has three radial slots 226 positioned 60° apart about securing flange 224. Securing flange 224 is in close contact with side 24a of frame 12a. A plurality of bolts 228 extends through slots 226 and is secured to side 24a of frame 12a. The angle between the long axis of gear-head 222 and associated drive system 74 relative to the vertical axis of frame 12a as indicated by a line 230, can be altered by loosening the bolts 228, then rotating frame 12a along the slots 226 of securing flange 224 and the associated drive system 74, then tightening bolts 228 such that securing flange 224 is secured with respect to frame 12a. Preferably, the angle between the vertical axis of frame 12a and drive system 74 is approximately 45°, however, other angles may be used.

Each of the tilling, shearing or cutting tools, such as first and second ground manipulation devices 50, 58, 59, 50a, 58a and 59a are removably fixed on their respective shafts using nuts and bolts. In addition, shafts 14, 18, 14a and 18a, are removable from within their respective bearings by removing a washer and a lock pin, thereby allowing for servicing or replacement of the associated parts.

As illustrated, frame 12 and its contents can be arranged on the mid-section of shafts 14 and 18. However, it should be noted that the frame 12 and its associated components such as sprockets 36, 38 and 44, as well as drive chain 46 and idler pulley 48 can be located on either the left or right side of gardening/landscaping system 10. More specifically, shafts 14 and 18 may be located within frame 12, such that each shaft extends outwardly from a single side of frame 12 sufficiently to allow each and every ground manipulation device 50, 58 and 59 to be located on a single side of frame 12.

As shown in FIG. 1, gardening/landscaping system 10 includes a handle 108 extending rearwardly therefrom. Because of the unique counter-rotational ground manipulation devices 50, 58 and 59, the handle 108 performs three important functions normally requiring complex transmissions, including stationary tilling, self-propelled forward or backward tilling, and control on speed of machine travel. All three functions can be readily obtained and by simply adjusting the height of handle 108 with respect to the ground. Stationary tilling may be accomplished when the machine is leveled with respect to the ground by leveling handle 108, whereby the forward digging force generated by the first and third ground manipulation devices 50 and 59 on shaft 14 will be canceled by an equal, rearward directed digging or shearing force generated by the second ground manipulation device 58 on shaft 18. The balanced but opposed digging or shearing forces generated by the counter-rotating ground manipulation devices 50, 58 and 59 allows the machine to stay stationary while the ground/soil is sheared and tilled beneath the machine. If the rear end of the machine is tilted upwards by placing an upward pressure on handle 108, the weight of the machine is shifted forward along the first and third ground manipulation devices 50 and 59 on shaft 14 to dig or shear deeper into the soil, thereby developing excess traction which will overcome that of the rearwardly mounted second ground manipulation device 58 and causing the machine to move forward. Likewise, if the rear of the machine is lowered by placing the downward force upon handle 108, the machine will move in a rearward direction. The depth of tilling and the speed of the forward or rearward movements of tilling system 10 can be readily controlled by the amount of upward or downward force exerted upon handle 108.

The reference numeral 11b (FIGS. 11 and 12) generally designates another embodiment of the working assembly. Since working assembly 11b is similar to the previously described working assembly 11, similar parts appearing in FIG. 2 and FIGS. 11 and 12 respectively, are represented by the same, corresponding reference numeral, except for the suffix "b" in the numerals of the latter. The working system 11b includes a pair of first ground manipulation devices 50b, a pair of support wheels 51, and a horizontally-oriented shearing device 110 adapted to shear grass, weeds, and small twigs that extend substantially vertically upward from and horizontally to the ground surface. Wheels 51 assist in supporting frame 12b above ground level. Shearing device 110 is mounted between frame 12b and a first ground manipulation device 50b on first shaft 14b. Shearing device 110 includes a horizontally-oriented shearing blade 112 that is affixed to an underside of frame 12b, and an auger-type blade 114 that is affixed to first ground manipulation device 50b on the side facing supporting frame 12b. Shearing blade 112 includes a first section 113 that is fixedly attached to frame 12b and a second section 115 that extends orthogonally downward from first section 113 and is in close contact with first ground manipulation device 50b mounted on first shaft 14b. First section 113 includes a plurality of forwardly facing comb-like projections 116 that trap vertically extending grass and weeds which is then sheared by the rotating auger blade 114. Second section 115 cooperates with first ground manipulation device 50b to shear horizontally extending foliage therebetween. This configuration provides shearing of grass in both the horizontal and vertical directions during the operation, thereby providing a well-defined sod edge. Preferably, another first ground manipulation device 50b of the pair is mounted on second shaft 18b such that their outer engaging edges 54 overlap whereby the pair of first ground manipulation devices 50b counter-rotate for additional shearing action, and for cutting a narrow trench.

Figure 12C:
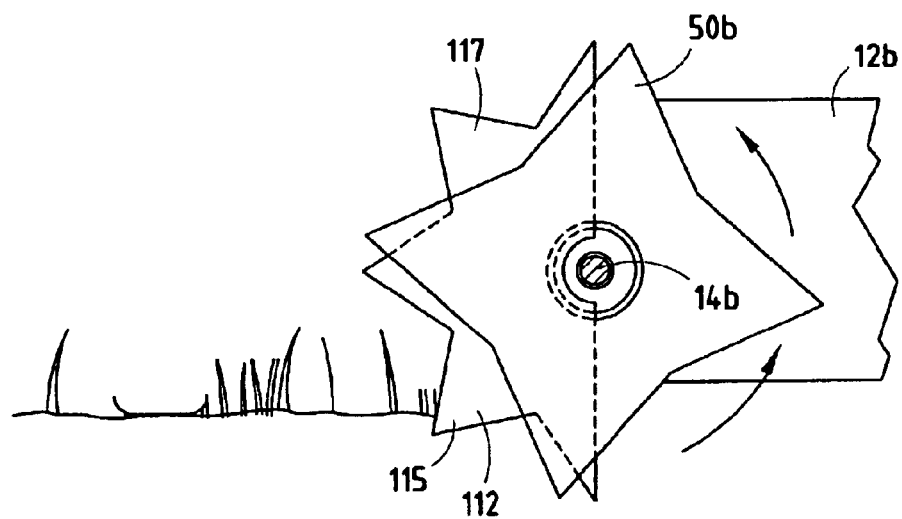
FIG. 12C is a side view of the alternative embodiment of the gardening/landscaping system as shown in FIG. 12B.

In an alternative embodiment, the shearing device 110 includes a stationary shearing blade 112 with a second section 115 (FIGS. 12B and 12C). The stationary shearing blade 112 is fixedly attached to a frame 12b about a shaft 14b. The second section 115 branches out radially into a plurality of shearing blades 117, while the blades 117 are kept in close planar contact with first ground manipulation device 50b by a spring 111. Furthermore, the stationary shearing blade 112 may extend rearward towards the second shaft 18b in parallel to an adjacent side of frame 12b. In operation, the stationary shearing blade 112 also serves as a shield for blocking loosened dirt from landing on the freshly cut lawn edge.

Although the shearing device 110 is illustrated with respect to gardening/landscaping system 10, the shearing device 110 may also be used in conjunction with a hand-held gardening/landscaping system such as that illustrated in FIGS. 9 and 10.

Figure 13:
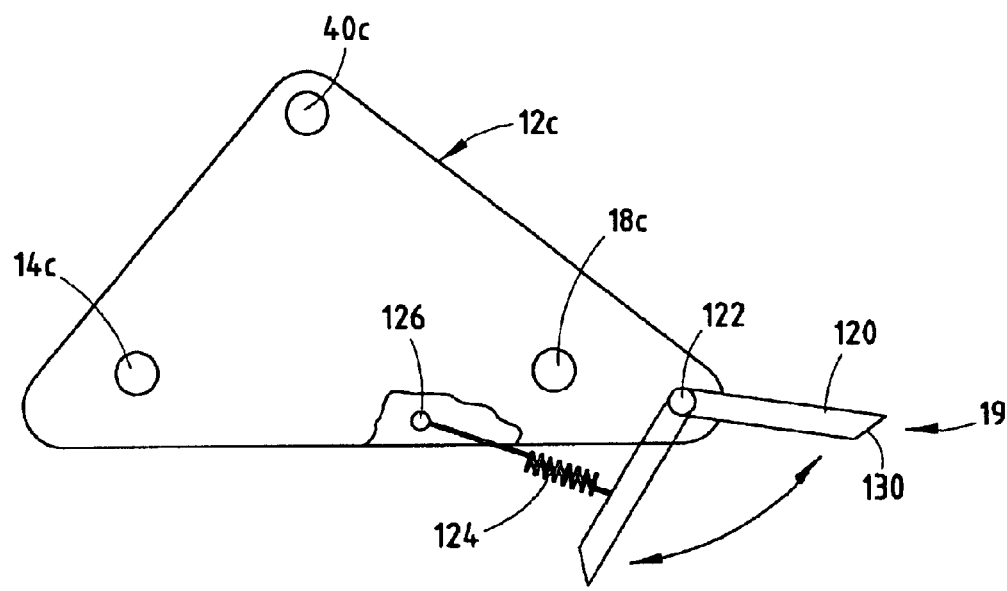
FIG. 13 is a side view of the transmission of the gardening/landscaping system including a recoil dampener.
Figure 14:
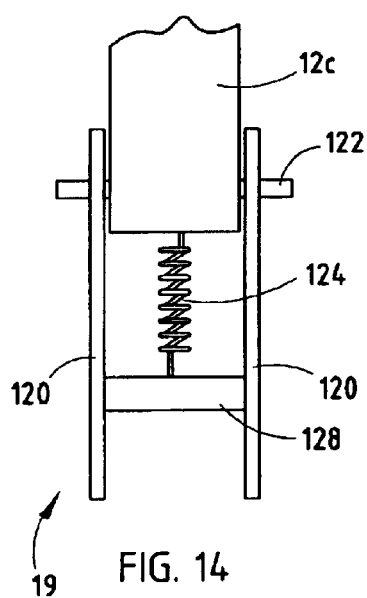
FIG. 14 is a rear view of the recoil dampener.

The reference numeral 12c (FIGS. 13 and 14) generally designates an alternative embodiment to frame 12 of gardening/landscaping system 10. Since frame 12c is similar to the previously described frame 12, similar parts appearing in FIG. 2 and FIGS. 13 and 14, respectively, are represented by the same, corresponding reference numeral, except for the suffix "c" in the numerals of the later. Frame 12c includes a recoil dampening system 19 adapted to prevent an associated gardening/landscaping system similar to walk-behind gardening/landscaping system 10 and/or hand-held gardening /landscaping system 74 from recoiling rearwardly towards an operator when associated ground manipulation devices contact hard soil and/or hard debris such as rocks and/or tree roots. The recoiled dampening system 19 includes a pair of ground engagement rods 120 juxtaposed across frame 12c, and are pivotally attached to a lower portion of frame 12c via a pivot pin 122 or attached around second shaft 18c. Recoil dampening system 19 may include a coil spring 124 that is fixedly attached to frame 12c at a point 126, and fixedly attached to a connection bar 128 extending between ground engagement rods 120.

In operation, the ground engagement rods 120 track along the top surface of the ground as the associated gardening/landscaping system 10 and/or 74 moves forwardly, thereby overcoming the force exerted on ground engagement rods 120 by coil spring 124. If the associated second ground manipulation devices 58c engage a hard portion of ground or other hard debris, the gardening/landscaping systems 10 or 74 may begin to move rearward toward the operator, the coiled spring 124 acts upon rods 120 thereby causing sharpened tips 130 of ground engagement rods 120 to dig into the ground and prevent the gardening/landscaping system 10 or 74 from moving rearward. If the rotational movement of the second ground manipulation devices 58c overcomes the opposite force being exerted on the gardening/landscaping systems 10 or 74 by the ground engagement rod 120, the coiled spring 124 causes the ground engagement rods 120 to continue to pivot about the pivot pin 122 or around the second shaft 18c thereby causing the second ground manipulation devices 58c to raise above the ground surface or at least to disengage from full force within the soil, thereby limiting or completely removing the rearward force exerted on the gardening/landscaping systems 10 or 74 by the second ground manipulation devices 58c and stopping the gardening/landscaping systems 10 or 74 from moving rearward. Alternatively, the gravitational weight will help rod 120 track along the top surface of the ground without spring 124.

Figure 15:
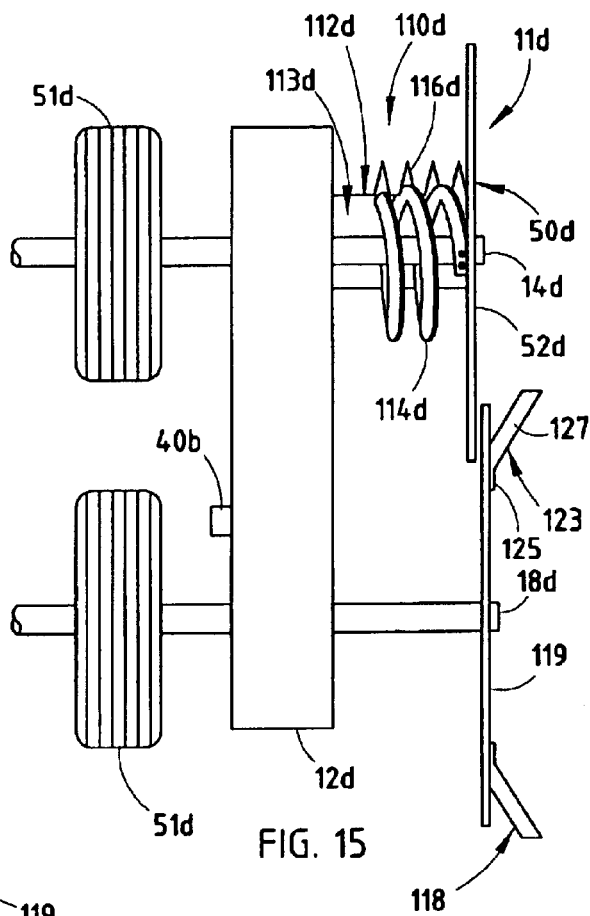
FIG. 15 is a top plan view of an alternative embodiment of the working assembly of the gardening/landscaping system.

The reference numeral 11d, FIG. 15, generally designates another embodiment of the working assembly. Since working assembly 11d is similar to the previously described working assembly 11b, similar parts appearing in FIGS. 2, 11, and 15, respectively, are represented by the same, corresponding reference numeral, except for the suffix "d" in the numerals of the latter.

The reference number 11d, as shown in FIG. 15, generally designates another embodiment of the working assembly. Since the frame 12d and working assembly 11d are similar to the previously described frame 12 and working assembly 11, all similar parts appearing in FIGS. 2, 11 and 15 are represented by the same, corresponding reference numeral, except for the suffix "d" in the numerals of the latter.

Figure 16:
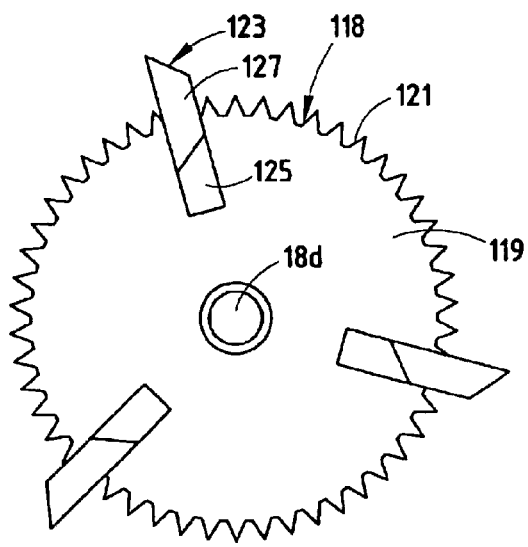
FIG. 16 is a side view of an alternative embodiment of the ground manipulation device.

As shown in FIGS. 15 and 16, working assembly 11d includes a trenching blade 118 removably mounted on second shaft 18d. Trenching blade 118 includes a planar section 119, an outer edge 121, a plurality of irregularities 121 extending along outer edge 121 and a plurality of digging blades 123. Each digging blade 123 includes a first section 125 fixedly attached to planar section 119, and a second section 127 that extends outwardly from planar section 119. Trenching blade 118 is removably mounted on second shaft 18d such that planar section 52d is in close contact with planar section 119. In operation, forward rotating first ground manipulation device 50d slices into the ground and trenching blade 118 penetrates the soil and digs a trench by deflecting the soil forwardly and away from planar section 119, thereby creating a trench with a well defined sod edge. In an alternative embodiment, the trenching blade 118 resembles the second and third ground manipulation devices, 58 and 59 of FIGS. 8A and 8B.

Figure 17:
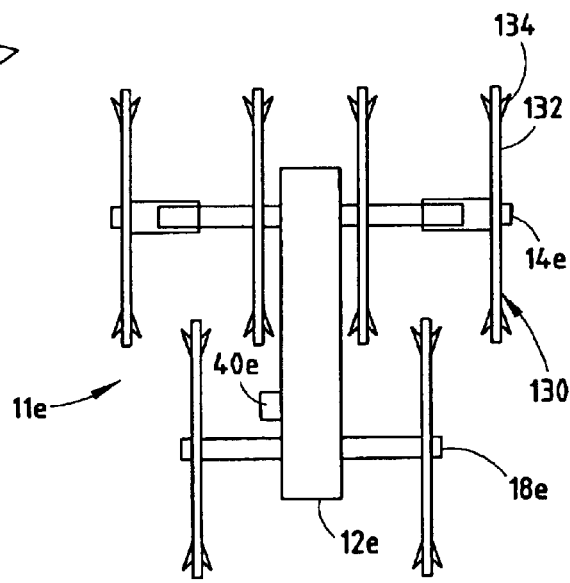
FIG. 17 is a top plan view of an alternative embodiment of the working assembly of the gardening/landscaping system.

The reference number 11e, as shown in FIG. 17, generally designates another embodiment of the working assembly. Since the frame 12e and working assembly 11e are similar to the previously described frame 12 and working assembly 11, all similar parts appearing in FIGS. 2, 7 and 17 are represented by the same, corresponding reference numeral, except for the suffix "e" in the numerals of the latter.

In the illustrated example of FIG. 17, working assembly 11e includes a plurality of removably mounted debris-cutting blades 130 each having a planar section 132 extending substantially perpendicular to shafts 14e and 18e and a plurality of chipping teeth 134 extending outwardly from each associated planar section 132. In operation, debris-cutting blades mounted on counter-rotating first shaft 14e and second shaft 18e simultaneously engage underground debris such as roots to create a scissors-like cutting action. In addition, chipping teeth 134 cooperate to chip and disintegrate such debris. It should be noted that working assembly 11e can be incorporated within gardening/landscaping systems 10 and 74.

The reference number 10f (FIG. 18) generally designates another embodiment of the gardening/landscaping system. Since the gardening/landscaping system 10f is similar to the previously described gardening/landscaping system 10, all similar parts appearing in FIG. 2, and FIG. 18 are represented by the same, corresponding reference numeral, except for the suffix "f" in the numerals of the latter.

Gardening/landscaping system 10f is constructed similarly to gardening/landscaping system 10 except that shafts 14e and 18e extend substantially parallel to the normal direction of travel of system 10f when in operation. The working assembly 11f includes a pair of circular cutting device 140 each having a planar section 142 that extends substantially perpendicular to first shaft 14f, and an outer engaging edge 144 having a plurality of irregularities 146 spaced therealong. Each device 140 is removably attached to shafts 14f or 18f. The plurality of irregularities 146 includes shearing blades 148 extending substantially perpendicular from each planar section 142.

Gardening/landscaping system 10f also includes a stationary shearing blade 150 fixed to frame 12f, that includes a plurality of saw teeth 151. The circular cutting devices 140 and stationary shearing blade 150 are housed with a forwardly opening housing 152 (FIG. 19) such that circular cutting devices 140 and stationary shearing blade 150 makes contact with above ground debris such as brush or small trees. In operation, shearing blades 148 engage and cut the brush and/or small trees, while stationary shearing blade 150 engages the brush and/or small trees preventing them from moving as they are engaged by shear blades 148. The vertical distance between stationary shear blade 150 and the ground is adjusted by placing or releasing downward pressure on handle 108f.

The reference numeral 10g (FIG. 20) generally designates another embodiment of the gardening/landscaping system. Since the gardening/landscaping system 10g is similar to the previously described gardening/landscaping system 10, all similar parts appearing in FIG. 2 and FIG. 20 are represented by the same, corresponding reference numeral, except for the suffix "g"in the numerals of the latter.

Figure 21:
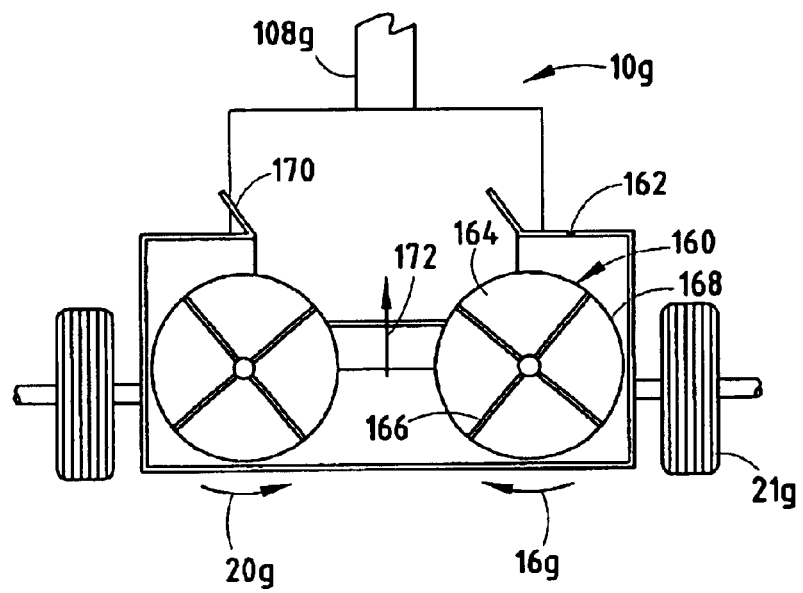
FIG. 21 is a front view of the second alternative embodiment of the walk-behind gardening/landscaping system.

Gardening/landscaping system 10g is similar in construction and orientation to garden/landscaping system 10f, and includes snow-throwing devices 160 housed within a housing 162 (FIG. 21) that opens at front such that the snow-throwing devices 160 contact mounded snow as gardening/landscaping system 10g travels in a forward direction. Each snow-throwing device 160 includes a planar section 164 that extends substantially perpendicular to shafts 14g and 18g, and a plurality of snow-engaging blades 166 that extend substantially perpendicular from planar section 164. Each blade 166 extends radially outward from shafts 14g or 18g and terminates at an outermost edge 168 of planar sections 164. Housing 162 includes a directionally adjustable snow chute 170 attached to the top thereof. In operation, snow throwing devices 160 engage and force snow therebetween and upwardly through chute 170 in a direction indicated by an arrow 172.

Figure 22:
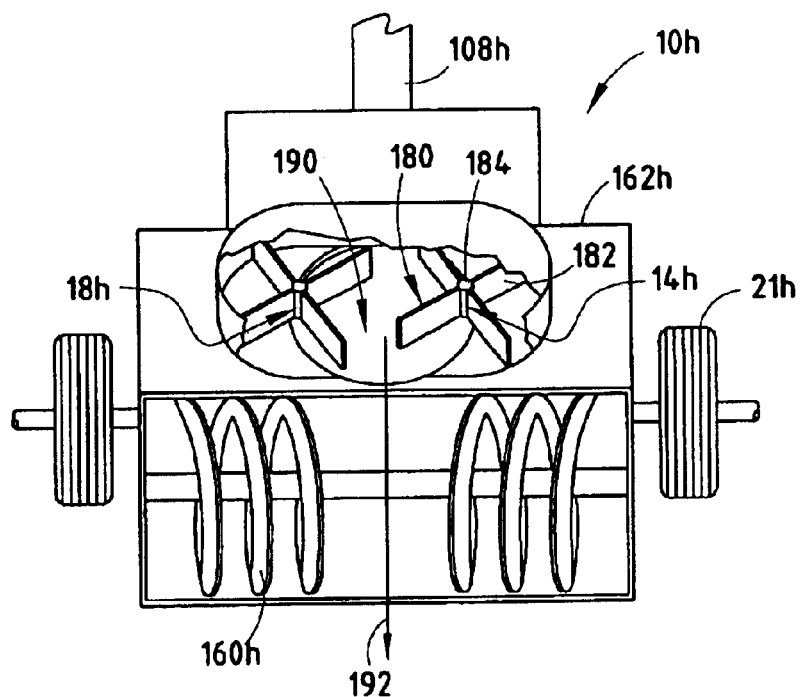
FIG. 22 is a perspective view of the second alternative embodiment of the walk-behind gardening/landscaping system including a secondary blowing system.

The reference numeral 10h (FIG. 22) generally designates another embodiment of the gardening/landscaping system. Since system 10h is similar to system 10g, similar parts appearing in FIG. 22 and FIGS. 20 and 21, respectively, are represented by the same, corresponding reference numeral, except for the suffix "h" in the numerals of the latter.

Gardening/landscaping system 10h includes a pair of circularly-shaped blower-fan devices 180 fixedly mounted on shafts 14h and 18h and including a plurality of evenly spaced snow throwing blades 182 that radiate from a center hub 184 of each blower-fan device 180.

In operation, the snow auger blade device 160h contact the snow at ground level and channel the snow to fan devices 180 through an aperture 190 in housing 162h whereby the blower fan devices 180 cooperate to force the snow out of gardening/landscaping system 10h in a direction indicated by an arrow 192.

Figure 23:
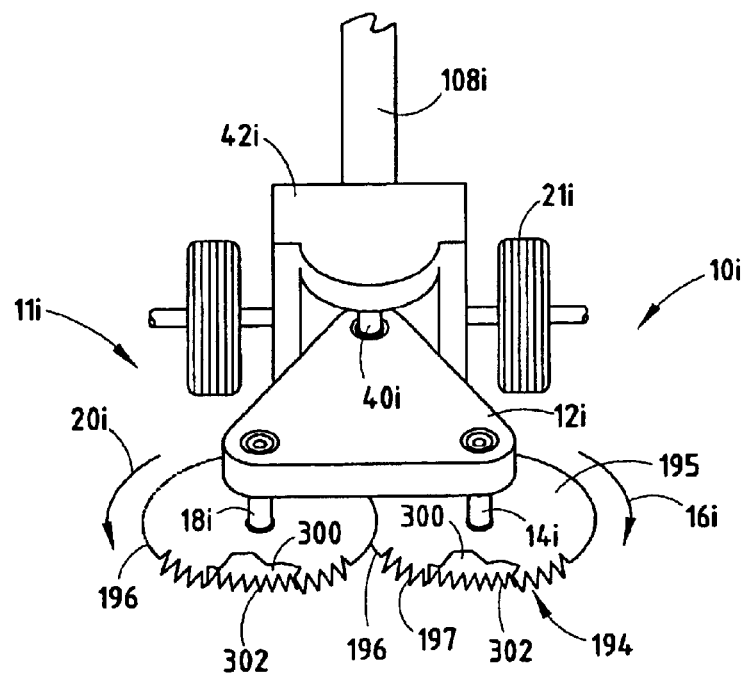
FIG. 23 is a perspective view of a third alternative embodiment of a walk-behind gardening/landscaping system.

The reference number 10i (FIG. 23) generally designates another embodiment of the gardening/landscaping system. Since gardening/landscaping system 10i is similar to the previously described gardening/landscaping system 10, all similar parts appearing in FIGS. 2 and 23 are represented by the same, corresponding reference numeral, except for the suffice "i" in the numerals of the latter.

Gardening/landscaping system 10i is similar in construction to gardening/landscaping system 10 with the most notable exception being the orientation of frame 12i and shafts 14i and 18i. Specifically, frame 12i is mounted with engine 42i such that frame 12i is substantially parallel with the ground. Shafts 14i and 18i are mounted similarly to gardening/landscaping system 10 and extend substantially perpendicular to frame 12i and towards the ground. Drive shaft 40i is operatively connected to shafts 14i and 18i similarly to shafts 14 and 18 of system 10. Working assembly 11i includes a pair of circularly-shaped cutting devices 194, each having a planar section 195 that extends substantially perpendicular to shafts 14i and 18i, and an outer engaging edge 196 having a plurality of irregularities 197 spaced therealong. Each device 194 is removably attached to an associated shaft 14i or 18i. In the illustrated example, the plurality of irregularities 197 is carbide teeth evenly spaced along the outer engaging edge 196. It should be noted that outer engaging edge 196 of one cutting device 194 may be smooth, having no irregularities 197. In addition, outer engaging edges 196 of each cutting device 194 may or may not overlap. It should further be noted that cutting devices 194 includes an adjustable torque converter in the form of clutch disk, that is adapted to maximizing drive chain life. In operation, cutting devices 194 cooperate to simultaneously engage and cut a tree or tree stump close to or at ground level. Cutting devices 194 may also be utilized with gardening/landscaping system 74 (FIG. 9).

Further, working assembly 11i can include a pair of stationary cutting disks 300 that are fixed with respect to frame 12i. Each stationary cutting disk 300, includes a plurality of cutting teeth 302 that cooperate with teeth 197 of disks 195.

Figure 24:
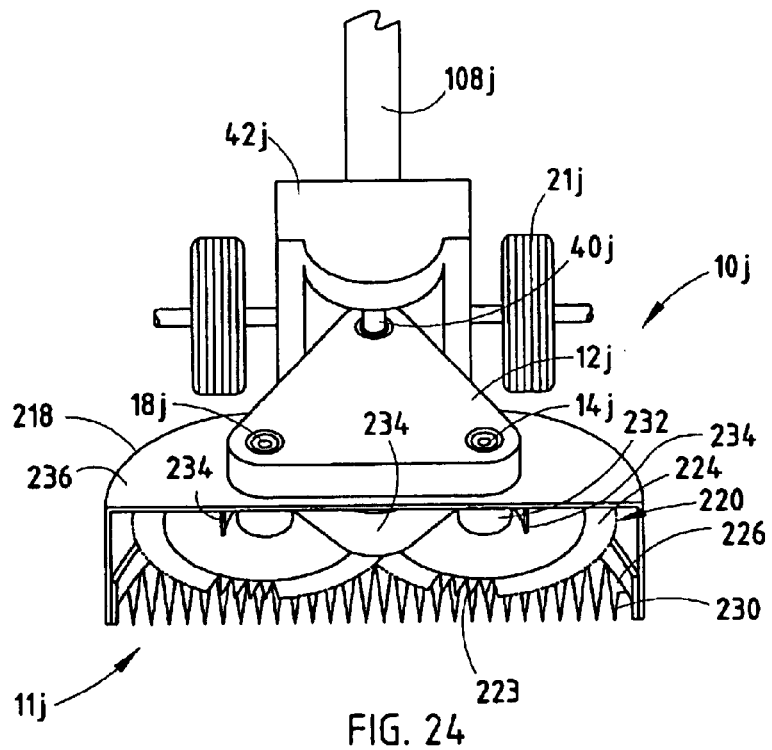
FIG. 24 is a perspective view of a fourth alternative embodiment of a walk-behind garden/landscaping system.

The reference numeral 10j generally designates another embodiment of the gardening/landscaping system. Since system 10j is similar to system 10i, all similar parts appearing in FIGS. 23 and 24, respectively, are represented by the same, corresponding reference numeral, except for the suffice "j" in the numerals of the latter.

Gardening/landscaping system 10j is similarly constructed and oriented as system 10i, and includes a forwardly opening housing 218. System 10j also includes a working assembly 11j which includes a pair of cutting disks 220 attached to shaft 14j and 18j, each having a plurality of cutting teeth 223 extending radially outward from an outer edge 224 thereof. Working assembly 11j also includes a stationary cutting plate 226 that is fixed on a bottom surface of housing 218, located immediately below cutting disks 220. Cutting plate 226 includes a plurality of forwardly facing comb-like teeth 230. System 10j further includes a pair of foliage grinding cylindrical blocks 232 located concentrically about and attached to shafts 14j and 18j. A stationary foliage grinding plate 234 extends laterally between the foliage grinding cylindrical blocks 232 and vertically between cutting disks 220 and a top 236 of housing 218. Foliage grinding plate 234 remains in close contact with foliage grinding cylindrical blocks 232 at all time during operation. In operation counter-rotating cutting disks 220 cooperate with one another and with stationary cutting plate 226 to shear and channel grass clippings between cylindrical blocks 232 and foliage grinding plate 234, whereby the contact between foliage ground blocks 232 with stationary foliage grinding plate 234 traps and mulches the grass clippings before discharging. It should be noted that working assembly 11j may also be utilized in conjunction with a hand-held gardening/landscaping system 74 such as that shown in FIG. 9.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A counter-rotating twin shaft gardening/landscaping system, comprising:
  a frame;
  a first shaft mounted within the frame for rotation in a first direction;
  a second shaft mounted within the frame for rotation in a second direction which is opposite to the first direction, the second shaft being mounted in a substantially parallel plane with the first shaft;
  a driving shaft operatively connected to the first and second shafts for driving the first shaft in the first direction and the second shaft in the second direction;

a first ground manipulation device attached to the first shaft, the first ground manipulation device having a planar section extending substantially perpendicular to the first shaft and an outer engaging edge having a plurality of irregularities;

a second ground manipulation device attached to the second shaft, the second ground manipulation device having a planar section extending substantially perpendicular to the second shaft and an outer engaging edge having a plurality of irregularities; and at least a select one of the first and second ground manipulation devices including a plurality of arms extending outwardly from the planar section, each arm having a first end and a second end being coupled to the planar section to form a closed loop with the planar section, wherein the planar sections of the first and second ground manipulation devices cooperate to penetrate a top surface of the ground, and wherein the arms engage the ground to deflect the soil away from the planar section of the select ground manipulation device.

2. The gardening/landscaping system of claim 1, wherein the first ground manipulation device and the second ground manipulation device are in close proximity to one another.

3. The gardening/landscaping system of claim 2, wherein the first ground manipulation device is distal in proximity to the frame than the second ground manipulation device, and wherein the arms are attached to the second ground manipulation device.

4. The gardening/landscaping system of claim 3, wherein the outer engaging outer edge of the first ground manipulation device includes a plurality of cutting teeth.

5. The gardening/landscaping system of claim 3, wherein the outer engaging edge of the second ground manipulation device includes a plurality of chipping teeth.

6. The gardening/landscaping system of claim 3, wherein the outer engaging edge of the first ground manipulation device includes a serrated portion.

7. The gardening/landscaping system of claim 3, wherein the outer engaging edge of at least one of the ground manipulation devices includes a smooth portion.

8. The gardening/landscaping system of claim 1, wherein the outer engaging outer edge of the first ground manipulation device includes a plurality of cutting teeth.

9. The gardening/landscaping system of claim 1, wherein the outer engaging edge of the second ground manipulation device includes a plurality of chipping teeth.

10. The gardening/landscaping system of claim 1, wherein the outer engaging edge of the first ground manipulation device includes a serrated portion.

11. The gardening/landscaping system of claim 1, wherein the gardening/landscaping system is a hand-held type system.

12. The gardening/landscaping system of claim 1, wherein the gardening/landscaping system is a walk-behind type system.

13. The gardening/landscaping device of claim 1, further including:

a third ground manipulation device attached to a select one of the first shaft and the second shaft, the third ground manipulation device including a planar section extending substantially perpendicular to the select shaft, and an outer engaging edge having a plurality of irregularities.

14. The gardening/landscaping system of claim 13, wherein the third ground manipulation device includes a plurality of arms extending radially outward from the planar section thereof, and wherein the arms of the third ground manipulation device engage the ground to deflect the soil away from the planar section thereof.

15. The gardening/landscaping system of claim 1, wherein the arms are connected via a bracket extending therebetween.

16. The gardening/landscaping system of claim 1, wherein the plurality of arms include at least two arms spaced equidistantly about the planar section of the select ground manipulation device.

17. A counter-rotating twin shaft gardening/landscaping system, comprising:

a frame having a front and defining a forward direction of travel;

a first shaft mounted within the frame for rotation in a first direction and extending forwardly of the frame in a direction substantially parallel with the forward direction of travel;

a second shaft mounted within the frame for rotation in a second direction which is opposite from the first direction, the second shaft being substantially parallel to the first shaft;

a drive shaft operatively connected to the first and second shafts for driving the first shaft in the first direction and the second shaft in the second direction;

a first material working device attached to the first shaft and including a substantially planar section and a plurality of first material engaging arms extending outwardly from the planar section;

a second material working device attached to the second shaft and including a substantially planar section and a plurality of outwardly extending second material engaging arms extending outwardly from the planar section; and wherein the material engaging arms extend about an outer periphery of the first and second material working devices, wherein the material working devices cooperate to dislodge debris from in front of the frame as the system moves in the forward direction.

18. The gardening/landscaping system of claim 17, wherein the material engaging arms of the first and second material working devices include a plurality of saw teeth.

19. The gardening/landscaping system of claim 18, wherein the saw teeth extend substantially perpendicular to the planar sections of the first and second material working devices.

20. The gardening/landscaping system of claim 19, further including:

a fixed engaging arm adapted to engage the debris and restrict the movement thereof as the debris engaged by the material working devices.

21. The gardening/landscaping system of claim 20, wherein the fixed engaging arm includes a plurality of forwardly extending projections.

22. The gardening/landscaping system of claim 21, wherein the forwardly extending projections of the fixed engaging arm are triangularly shaped.

23. A counter-rotating twin shaft gardening/landscaping system, comprising:

a frame having a front and defining a forward direction of travel;

a first shaft mounted within the frame for rotation in a first direction and extending forwardly of the frame in a direction substantially parallel with the forward direction of travel;

a second shaft mounted within the frame for rotation in a second direction which is opposite from the first direction, the second shaft being substantially parallel to the first shaft;

a drive shaft operatively connected to the first and second shafts for driving the first shaft in the first direction and the second shaft in the second direction;

a first material working device attached to the first shaft and including a substantially planar section and a plurality of first material engaging arms extending outwardly from the planar section;

a second material working device attached to the second shaft and including a substantially planar section and a plurality of outwardly extending second material engaging arms extending outwardly from the planar section wherein the material working devices cooperate to dislodge debris from in front of the frame as the system moves in the forward direction; and a fixed engaging arm adapted to engage the debris and restrict the movement thereof as the debris engaged by the material working devices wherein the fixed engaging arm includes a plurality of forwardly extending projections.

24. The gardening/landscaping system of claim 23, wherein the forwardly extending projections of the fixed engaging arm are triangularly shaped.

25. A counter-rotating twin shaft gardening/landscaping system, comprising:

a frame having a front and defining a forward direction of travel;

a first shaft mounted within the frame for rotation in a first direction and extending forwardly of the frame in a direction substantially parallel with the forward direction of travel;

a second shaft mounted within the frame for rotation in a second direction which is opposite from the first direction, the second shaft being substantially parallel to the first shaft;

a drive shaft operatively connected to the first and second shafts for driving the first shaft in the first direction and the second shaft in the second direction;

a first material working device attached to the first shaft and including a substantially planar section and a plurality of first material engaging arms extending outwardly from the planar section;

a second material working device attached to the second shaft and including a substantially planar section and a plurality of outwardly extending second material engaging arms extending outwardly from the planar section wherein the material working devices cooperate to dislodge debris from in front of the frame as the system moves in the forward direction, the first and second material engaging arms extend substantially perpendicular to the planar sections of the material working devices, and wherein the material engaging arms extend across a substantial portion of the planar sections of the material working devices, and are adapted to dislodge snow from in front of the frame as the system moves in a forward direction; and a housing having an exhaust aperture located therein, and wherein the arms of the material working devices cooperate to force the snow through the housing and through the exhaust aperture.

26. The gardening/landscaping system of claim 25, wherein the housing further includes a direction chute that directs snow traveling through the exhaust aperture in a selected direction.

27. A counter-rotating twin shaft gardening/landscaping system, comprising:

a frame having a front and defining a forward direction of travel;

a first shaft mounted within the frame for rotation in a first direction and extending forwardly of the frame in a direction substantially parallel with the forward direction of travel;

a second shaft mounted within the frame for rotation in a second direction which is opposite from the first direction, the second shaft being substantially parallel to the first shaft;

a drive shaft operatively connected to the first and second shafts for driving the first shaft in the first direction and the second shaft in the second direction;

a first material working device attached to the first shaft and including a substantially planar section and a plurality of first material engaging arms extending outwardly from the planar section;

a second material working device attached to the second shaft and including a substantially planar section and a plurality of outwardly extending second material engaging arms extending outwardly from the planar section wherein the material working devices cooperate to dislodge debris from in front of the frame as the system moves in the forward direction, and wherein the material engaging arms extend across a substantial portion of the planar sections of the material working devices, and are adapted to dislodge snow from in front of the frame as the system moves in a forward direction; and at least one snow auger blade device mechanically coupled to a drive shaft that drives the first shaft in a first direction and the second shaft in a second direction, and the snow auger blade device collects snow and channels the snow to the material working devices that propel the snow away from the system.

28. The gardening/landscaping system of claim 27, wherein the material working device includes a generally planar section and at least one snow engaging arm extending outwardly from the planar section thereof.

29. The gardening/landscaping system of claim 28, wherein the snow engaging arm of the material working device extends substantially perpendicular from the planar section thereof.

30. The gardening/landscaping system of claim 25, wherein the housing further includes a direction chute that directs snow traveling through the exhaust aperture in a selected direction.

31. A counter-rotating twin shaft gardening/landscaping system, comprising:

a frame having a front and defining a forward direction of travel;

a first shaft mounted within the frame for rotation in a first direction and extending forwardly of the frame in a direction substantially parallel with the forward direction of travel;

a second shaft mounted within the frame for rotation in a second direction which is opposite from the first direction, the second shaft being substantially parallel to the first shaft;

a drive shaft operatively connected to the first and second shafts for driving the first shaft in the first direction and the second shaft in the second direction;

a first material working device attached to the first shaft and including a substantially planar section and a plurality of first material engaging arms extending outwardly from the planar section;

a second material working device attached to the second shaft and including a substantially planar section and a plurality of outwardly extending second material engaging arms extending outwardly from the planar section, wherein the material working devices cooperate to dislodge debris from in front of the frame as the system moves in the forward direction; and at least one snow auger blade device mechanically coupled to a drive shaft that drives the first shaft in a first direction and the second shaft in a second direction, and the snow auger blade device collects snow and channels the snow to the material working devices that propel the snow away from the system.

32. The gardening/landscaping system of claim 31, wherein the material working device includes a generally planar section and at least one snow engaging arm extending outwardly from the planar section thereof.

33. The gardening/landscaping system of claim 32, wherein the snow engaging arm of the snow-blowing device extends substantially perpendicular from the planar section thereof.

34. The gardening/landscaping system of claim 33, further including:

a housing having an exhaust aperture located therein, and wherein the arms of the material working devices cooperate to force snow through the housing and through the exhaust aperture.

35. A counter-rotating twin shaft gardening/landscaping system, comprising:

a frame having a front and defining a forward direction of travel;

a first shaft mounted within the frame for rotation in a first direction and extending forwardly of the frame in a direction substantially parallel with the forward direction of travel;

a second shaft mounted within the frame for rotation in a second direction which is opposite from the first direction, the second shaft being substantially parallel to the first shaft;

a drive shaft operatively connected to the first and second shafts for driving the first shaft in the first direction and the second shaft in the second direction;

a first material working device attached to the first shaft and including a substantially planar section and a plurality of first material engaging arms extending outwardly from the planar section;

a second material working device attached to the second shaft and including a substantially planar section and a plurality of outwardly extending second material engaging arms extending outwardly from the planar section wherein the material working devices cooperate to dislodge debris from in front of the frame as the system moves in the forward direction; and first cutting device includes at least one aperture extending through the planar section thereof and circumferentially about the first shaft; and a tube extending about the first shaft and through the aperture extending through the planar section of the first ground manipulating device, wherein the tube is fixed with respect to the frame.

36. The gardening/landscaping system of claim 35, wherein the second material working device includes at least one shearing blade extending outwardly from the planar section of the first material working device and longitudinally along the tube.

37. The gardening/landscaping system of claim 35, wherein the first material working device includes at least one sheering blade extending outwardly from the planar section of the first material working device and longitudinally along the first shaft.

* * * * *